US012802401B2

(12) United States Patent
Sakmann et al.

(10) Patent No.: US 12,802,401 B2
(45) Date of Patent: Nov. 17, 2026

(54) DEVICE AND THE COMPUTER IMPLEMENTED METHOD FOR PROCESSING A DIGITAL IMAGE FOR ANOMALY DETECTION

(71) Applicant: Robert Bosch GmbH, Stuttgart (DE)

(72) Inventors: Kaspar Sakmann, Stuttgart (DE); Dan Zhang, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 246 days.

(21) Appl. No.: 18/780,841

(22) Filed: Jul. 23, 2024

(65) Prior Publication Data

US 2025/0046061 A1 Feb. 6, 2025

(30) Foreign Application Priority Data

Aug. 4, 2023 (EP) .................................... 23189834

(51) Int. Cl.
*G06V 10/764* (2022.01)
*G05B 23/02* (2006.01)
(Continued)

(52) U.S. Cl.
CPC ....... *G06V 10/764* (2022.01); *G05B 23/0275* (2013.01); *G06V 10/774* (2022.01); *G06V 20/58* (2022.01)

(58) Field of Classification Search
CPC .... G06V 10/764; G06V 10/774; G06V 20/58; G06V 20/56; G06V 10/82;
(Continued)

(56) References Cited

U.S. PATENT DOCUMENTS 5,414,719 A * 5/1995 Iwaki .................... H03M 13/01 708/492
10,522,253 B2 * 12/2019 Itu ........................ A61B 6/5217
(Continued)

FOREIGN PATENT DOCUMENTS

WO WO-2020113202 A1 * 6/2020 ............. A61H 3/061

OTHER PUBLICATIONS

"Anastasios N. Angelopoulos et. al., A Gentle Introduction to Conformal Prediction and Distribution-Free Uncertainty Quantification, Dec. 2022, Machine Learning cs.LG, Artificial Intelligence, arXiv:2107.07511" (Year: 2022).*
"Maria Sayu Yamamoto et al., Modeling Complex EEG Data Distribution on the Riemannian Manifold Toward Outlier Detection and Multimodal Classification, Jul. 2023, IEEE Transactions on Biomedical Engineering" (Year: 2023).*
(Continued)

*Primary Examiner* — Chineyere Wills-Burns
*Assistant Examiner* — Phuong Hau Cai
(74) *Attorney, Agent, or Firm* — NORTON ROSE FULBRIGHT US LLP

(57) ABSTRACT

Device and computer implemented method for processing a digital image for anomaly detection. The method includes providing a model that is trained with a data set that includes digital images to output probabilities that are assigned to classes in a set of classes for classifying or semantically segmenting the digital image depending on the digital image; determining the probabilities for the digital image with the model; determining a size of a sub-set of the set of classes depending on a sum of the probabilities that are assigned to the classes in the sub set and depending on a first threshold; and detecting an anomaly depending on the size; wherein the sum of the probabilities is smaller than the first threshold, determining the size of the sub-set comprises determining the first threshold depending on a weighted sum of scores, a score is weighted in the weighted sum.

11 Claims, 2 Drawing Sheets

(51) Int. Cl.
*G06V 10/774* (2022.01)
*G06V 20/58* (2022.01)

(58) Field of Classification Search
CPC ............... G05B 23/0275; G06F 18/256; G06F 18/2433; G06T 7/0002; G06T 2207/20081; G06T 2207/20084
See application file for complete search history.

(56) References Cited

U.S. PATENT DOCUMENTS

2003/0220775 A1* 11/2003 Jourdan ................... G01V 1/30
703/2
2016/0041105 A1* 2/2016 Angelopoulos ........ G01N 31/22
436/95
2021/0117760 A1* 4/2021 Krishnan ............. G06N 3/0464
2021/0312622 A1* 10/2021 Buckler ................. A61B 6/032
2024/0017743 A1* 1/2024 Farid ..................... B60W 30/09

OTHER PUBLICATIONS

Angelopoulos and Bates: "A Gentle Introduction to Conformal Prediction and Distribution-Free Uncertainty Quantification," arXiv:2107.07511v6, (2022), pp. 1-51, XP093121708.
Bates, et al: "Testing for Outliers with Conformal p-values," arXiv:2104.08279v3, (2022), pp. 1-81, XP091213888.
Pikard Laxhammar: "Conformal Anomaly Detection. Detecting abnormal trajectories in surveillance applications," Doctoral Dissertation, Univ. of Skoevde, (2014), pp. 1-191, XP093122277.
Xu et al., "Conformal Prediction Interval for Dynamic Time-Series," Proceedings of The 38$^{th}$ International Conference on Machine Learning, PMLR 139, 2021, pp. 1-29.
Farid et al., "Failure Prediction With Statistical Guarantees for Vision-Based Robot Control," Robotics: Science and Systems, 2022, pp. 1-13.
Guan et al., "Prediction and Outlier Detection in Classification Problems," Royal Statistical Society, Series B, Statistical Methodology, vol. 84, 2022, pp. 524-546.

* cited by examiner

DEVICE AND THE COMPUTER IMPLEMENTED METHOD FOR PROCESSING A DIGITAL IMAGE FOR ANOMALY DETECTION

CROSS REFERENCE

The present application claims the benefit under 35 U.S.C. § 119 of European Patent Application No. EP 23 18 9834.7 filed on Aug. 4, 2023, which is expressly incorporated herein by reference in its entirety.

FIELD

The present invention relates to a device and a computer-implemented method for processing a digital image for anomaly detection.

Processing a digital image for anomaly detection is a safety relevant topic in particular in autonomous driving.

SUMMARY

A device and the computer implemented method for processing a digital image for anomaly detection mitigates a performance degradation of the anomaly detection.

According to an example embodiment of the present invention, the method comprises providing a model that is trained with a data set that comprises digital images to output probabilities that are assigned to classes in a set of classes for classifying or semantically segmenting the digital image depending on the digital image, determining the probabilities for the digital image with the model, determining a size of a sub-set of the set of classes depending on a sum of the probabilities that are assigned to the classes in the sub-set and depending on a first threshold, and detecting an anomaly depending on the size, wherein the sum of the probabilities that are assigned to the classes in the sub-set is smaller than the first threshold, wherein determining the size of the sub set comprises determining the first threshold depending on a weighted sum of scores, wherein a score is weighted in the weighted sum depending on a likelihood ratio between a distribution of the probabilities for the digital image and a distribution of the probabilities of the digital images in the data set. The size may be considered as anomaly score. The size is based on a conformal prediction of the classes. The term size in this context means a set size, i.e. number of elements in the set. The sub-set comprises the classes that are predicted with the highest confidence. The size of the sub-set, i.e. the number of elements in the sub-set, indicates an uncertainty of the prediction and thus a likelihood for an anomaly, e.g. an outlier. The likelihood ratio weights the scores to consider a domain shift from a domain of the data set that is used for training the model to a domain of the digital image.

According to an example embodiment of the present invention, providing the model may comprise training the model depending on the data set, wherein the data set comprises digital images depicting at least one object in a first environment or in a first environmental condition, in particular in a first lighting condition, preferably at night time, or in a first weather condition, preferably in the rain, or in a second environment or in a second environmental condition, in particular in a second lighting condition, preferably at day time, or in a second weather condition, preferably in sunshine, and wherein the method comprises capturing the digital image for anomaly detection in the first environment or the first environmental condition or in the second environment or the second environmental condition. The model is trained on a buffer of digital images that were captured in different environmental conditions. The trained model is thus configured for outputting predictions of classes in the different environment or environmental conditions it is trained for. Thus, a degradation of the performance is mitigated when a shift of the digital images that are processed for anomaly detection towards one particular environmental condition occurs.

According to one example embodiment of the present invention, the method comprises capturing the digital image, in particular a video, a radar, a LiDAR, an ultrasonic, a motion or thermal image, in an environment of a technical system, in particular an environment of a robot, a vehicle, a manufacturing machine, a power tool, a medical device, an access control system or a personal assist system, preferably an environment in front of a vehicle, and to operate the technical system upon detecting the anomaly, in particular to trigger a safety function, preferably an emergency stop or an emergency braking of the vehicle.

According to an example embodiment of the present invention determining the size of the sub-set may comprise selecting the classes for the sub-set from the set of classes such that the sum of the probabilities that are assigned to the classes in the sub-set is smaller than a first threshold. The sub-set is an adaptive predictive set that adapts according to the first threshold.

According to an example embodiment of the present invention, determining the size of the sub-set may comprise determining the score depending on the largest of the probabilities. The label provides the ground truth class for the digital image. The score comprises the largest probabilities the model outputs. The score influences the size of the sub-set of classes.

According to an example embodiment of the present invention, the method may comprise determining the score depending on a sum of the largest of the probabilities. The sum is an exemplary score function. The conformal prediction is independent of the specific choice of score function, however the choice of the score function influences the size of the prediction sets.

According to an example embodiment of the present invention, providing the model may comprise determining the score for a plurality of pairs, wherein the first threshold is determined depending on a predetermined quantile of the scores that are determined for the plurality of pairs.

According to an example embodiment of the present invention, the method may comprise detecting the anomaly upon detecting that the size is equal to a second threshold or that the size is larger than a second threshold. A digital image that is harder to predict, i.e. classify or semantically segment, leads to a larger sub-set than a digital image that is easier to predict. The second threshold is a parameter to configure the sensitivity of the anomaly detection.

According to an example embodiment of the present invention, providing the model may comprise adding the largest of the probabilities to the sum in particular in a descending order of the probabilities. According to the descending order, the sum sums up the largest probabilities until it includes the probability of the class that is the ground truth class.

According to an example embodiment of the present invention, the device for processing the digital image for anomaly detection comprises at least one processor, and at least one storage, wherein the at least one storage is configured to store instructions that, when executed by the at least one processor, cause the device to execute the method of the present invention, wherein the at least one processor is configured to execute the instructions. The device has advantages that correspond to the advantages of the method of the present invention.

According to an example embodiment of the present invention, a computer program for processing a digital image for anomaly detection may comprise computer-readable instructions that, when executed by a computer, cause the computer to execute the method of the present invention. The computer program has advantages that correspond to the advantages of the method of the present invention.

Further embodiments are derived from the following description and the figures.

DETAILED DESCRIPTION OF EXAMPLE EMBODIMENTS

Figure 1:
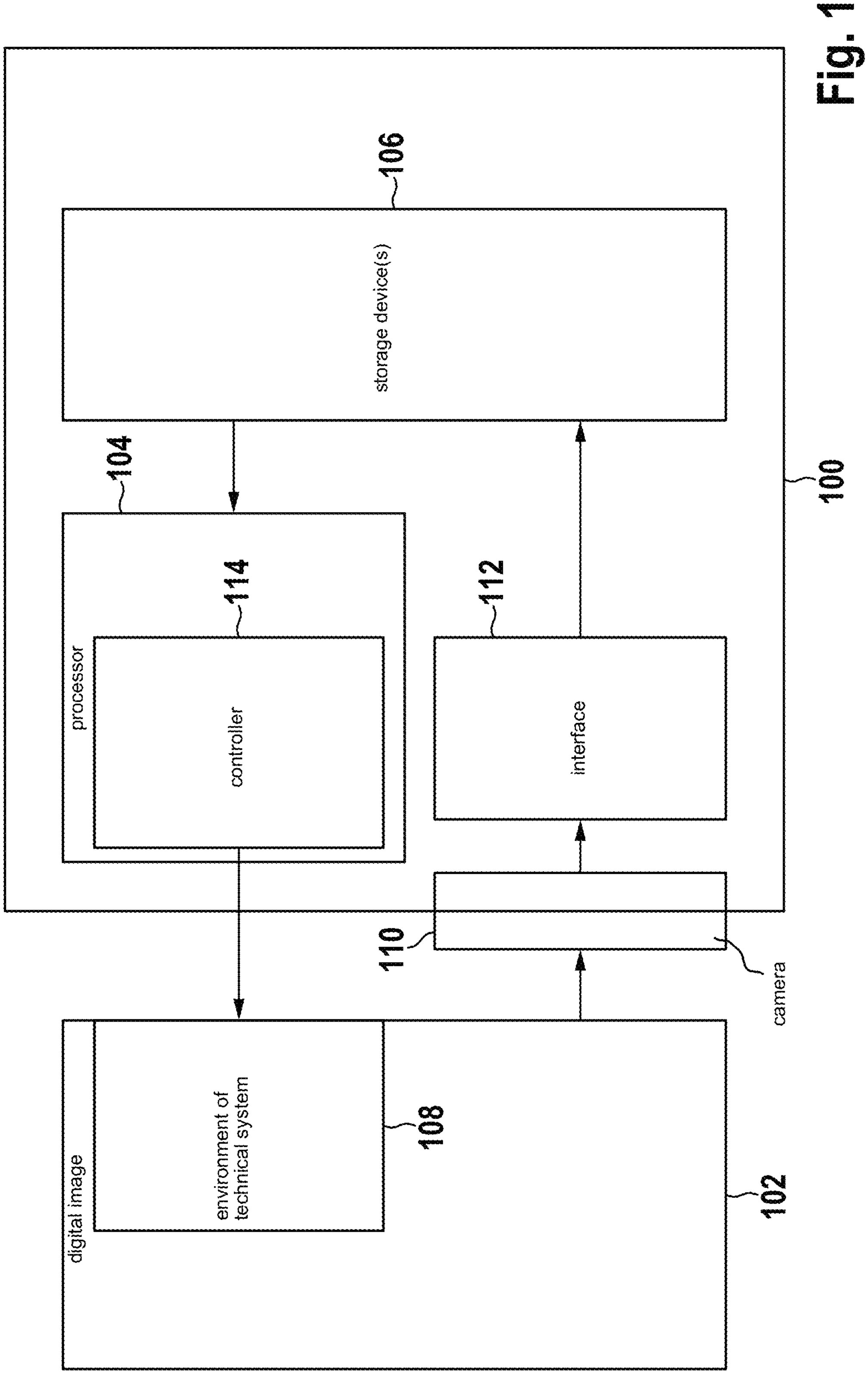
FIG. 1 schematically depicts a device for processing a digital image for anomaly detection, according to an example embodiment of the present invention.
Figure 2:
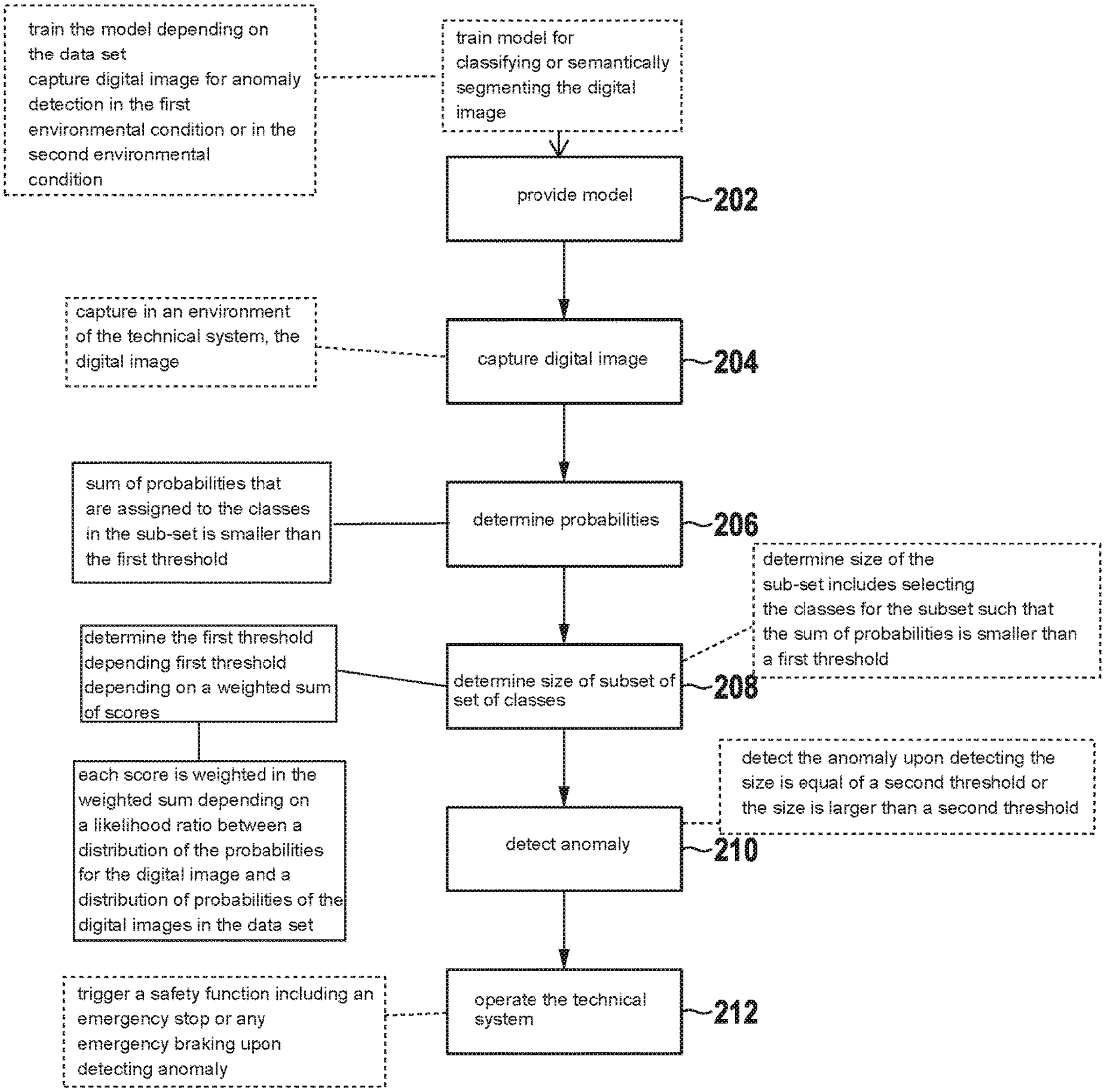
FIG. 2 depicts a flow-chart comprising steps of a method for processing the digital image for anomaly detection, according to an example embodiment of the present invention.

The FIG. 1 schematically depicts a device 100 for processing a digital image 102 for anomaly detection.

The device 100 comprises at least one processor 104, and at least one storage 106.

The at least one storage 106 is configured to store instructions. The instructions are configured to cause the device 100 to execute a method for processing digital images for anomaly detection, when executed by the at least one processor 104.

The at least one processor 104 is configured to execute the instructions.

According to an example, the instructions comprise computer-readable instructions. A computer program may comprise the computer-readable instructions. A computer may be configured to execute the computer-readable instructions. The computer-readable instructions may cause the computer to execute the method.

The computer-implemented method is described for a model. The model may be configured for classifying the digital image 102 that is provided as input to the model. The model may be configured for semantically segmenting the digital image 102 that is provided as input to the model.

The digital image 102 may be a video, a radar, a LiDAR, an ultrasonic, a motion or thermal image.

The digital image 102 may be captured in an environment of a technical system 108. The technical system 108 is a physical system.

The technical system 108 may comprise a robot. The technical system 108 may be a vehicle, a manufacturing machine, a power tool, a medical device, an access control system or a personal assist system.

The digital image may be captured with a camera 110. The device 100 may comprise the camera 110 or an interface 112 for receiving digital images from the camera 110.

According to an example, the device 100 comprises the camera 110 and the camera 110 is mounted to the vehicle and is configured to capture digital images of an environment of the vehicle, in particular in front of the vehicle.

The device 100 may comprise a controller 114 that is configured to operate the technical system 108.

The device 100 may be configured to trigger a safety function upon detecting an anomaly. The controller 114 may be configured to execute the safety function. According to an example, the safety function is an emergency stop or an emergency braking. According to an example, the device 100 is configured to trigger the controller 114 to execute an emergency stop or an emergency braking.

The model provides a framework of conformal prediction for predicting for a digital image x probabilities $\hat{f}_\iota(x)$ for classes of a set of classes and for determining an adaptive predictive set, i.e. a sub-set C(x) of the set of classes, that contains the classes for that the model outputs a higher probability $\hat{f}_\iota(x)$ than for other classes of the set of classes.

A property of conformal prediction with adaptive prediction sets is, that a harder to classify digital image x leads to a larger predictive set, i.e. a larger sub-set C(x), than an easier to classify digital image. A conformal out of distribution detection is based on a size |C(x)| of the sub-set C(x). This means the size |C(x)| of the sub-set C(x) may be used as an outlier score. The larger the sub-set C(x) is the larger is the uncertainty of the model and the probability that the digital image x is an outlier, i.e. an anomaly.

The model exploits the coverage guarantee provided by a weighted conformal prediction under a domain shift from a source domain to a target domain to ensure coverage also in the target domain.

The model provides a coverage value 1−α. In the example the coverage value comprises a user definable parameter α. In the example, the parameter α is chosen before the method starts. The method may comprise prompting a user for the parameter α.

An exemplary training data set comprising k pairs of a digital image x and a label y $$(x, y) \in X \times Y$$

from a source distribution P(X,Y).

A calibration data set for example comprises digital images $x_1, \ldots, x_n$ from the source distribution P(X,Y). Under the assumption that test data, e.g. a digital image $x_{n+1}$, is sampled from the source distribution P(X,Y), the framework of conformal prediction ensures that for the test data a probabilistic coverage guarantee can be given, in the sense that the probability that the class that is the ground truth class is contained in the sub-set is at least the coverage value 1−α. The test data and the training data set and the calibration data set may comprise digital images of objects that may appear in a real world environment of the technical system 108. The digital images may be captured in a first environmental condition or in a second environmental condition. The digital images may be captured in a first environment or a second environment.

The calibration data set comprising n pairs of a digital image $x_i$ and a label $y_i$ from the source distribution P(X,Y):

$$(x, y)_{i=1, \ldots, n} \in X \times$$

The digital images are taken to be $x \in R^{H \times W \times C}$.

The labels represent the ground truth, i.e. a class from a set of classes. For example, the labels $y \in [1, \ldots, N]^{H \times W}$ are given for semantic segmentation. For example, the labels $y \in [1, \ldots, N]$ are given for classification of digital images.

The model is configured to output the probabilities $\hat{f}_i(x)$ for the classes of the set of classes. In the example, the model is configured to output the probabilities $\hat{f}_i(x)$ as softmax probabilities. The model may be configured to output the probabilities $\hat{f}_i(x)$ without or with a different normalization.

The model is trained with the training data set to output the probabilities $\hat{f}_i(x)$.

The model may contain a segmentation network F, that outputs, for H×W pixels of a given digital image x, respective probabilities $\hat{f}_i(x)$ for i=1, . . . , N for the N classes of the set of classes depending on the given digital image x. This means the model outputs H×W probabilities $\hat{f}_i(x)$ that semantically segment H×W pixels of the digital image.

The model may contain a classification network F, that outputs probabilities $\hat{f}_i(x)$ for i=1, . . . , N for the N classes of the set of classes depending on the given digital image x.

The model is configured to determine a sub-set $C(x_{n+1})$ for a digital image $x_{n+1}$ based on a plurality of scores $s_1(x,y)$, . . . , $s_n(x,y)$ for a plurality of n digital images $x_1, \ldots, x_n$ from the calibration data set.

The model is configured to determine the plurality of scores $s_1(x,y)$, . . . , $s_n(x,y)$ depending on the probabilities $\hat{f}(x)_i$, . . . , $\hat{f}(x)_i$ the model outputs for the respective digital images $x_1, \ldots, x_n$ of the calibration data set.

According to an example, a score $s_i(x)$ for an exemplary image x is determined, by adding the largest of the probabilities $\hat{f}(x)_i$ to a sum in a descending order of the probabilities $\hat{f}(x)_i$.

This means, the score s(x) is determined depending on the sum of the largest of the probabilities $\hat{f}(x)$.

According to an example, the exemplary score s(x) is $$s(x, y) = \sum_{i=1}^{j} \hat{f}(x)_{\pi_i(x)}$$

wherein a permutation $\pi_i(x)$ orders the probabilities $\hat{f}(x)_{\pi_i(x)}$ descendingly and the sum runs until the index j, i.e. $y=\pi_j(x)$. The sum is an example for the score function.

The model is configured to determine a first threshold depending on a plurality of the scores.

The model is configured to determine the first threshold for the exemplary image x depending on a quantile $\hat{q}$ of the plurality of scores:

$$\hat{q}(x) = \inf\left\{s_j : \sum_{i=1}^{j} p_i^w(x) 1\{s_i \leq s_j\} \geq 1 - \alpha\right\}$$

This means the quantile is the infimum of a sub-set $s_i$ for i=1, . . . , j that comprises scores $s_i$ in an ascending order $s_i \leq s_j$ for that a weighted sum of the scores in the sub-set is equal to or exceeds the coverage value 1−α.

The weighted sum comprises weights $$p_i^w(x)$$

for the scores $s_i$

The weights $$p_i^w(x)$$

reweight the scores $s_i$ to apply them in the target domain. The weights adapt the model to the domain shift.

The weights $$p_i^w(x)$$

depend on a likelihood ratio $$w(x_{n+1}) = \frac{p_{test}(x_{n+1})}{p_{train}(x_{n+1})}$$

between a distribution of the probabilities $p_{test}(x_{n+1})$ for the digital image $x_{n+1}$ and a distribution of the probabilities $p_{train}(x_{n+1})$ of the digital images in the training data set.

To account for a domain shift from a training domain to a test domain, a classifier may be trained on the training data set, that estimates the likelihood ratio of the digital image $x_{n+1}$ to stem from either the training domain or the test domain. In the example of city or countryside domain, the classifier would would then estimate $$w(x_{n+1}) = \frac{p_{countryside}(x_{n+1})}{p_{city}(x_{n+1})}$$

The digital image $x_{n+1}$ is a new datapoint that was just collected e.g. from the camera 110. For the digital images from the training data set are datapoints for that the weights $w(x_i)$ can be precomputed.

$$w(x_i) = \frac{p_{countryside}(x_i)}{p_{city}(x_i)}$$

The precomputed weights $w(x_i)$ are used to weight the empirical distribution of the scores for the new datapoint.

The likelihood ratio $w(x_{n+1})$ is used according to an example to determine the weights:

$$p_i^w(x_{n+1}) = \frac{w(x_i)}{\sum_{j=1}^{n} w(x_j) + w(x_{n+1})}$$

$$p_{n+1}^w(x_{n+1}) = \frac{w(x_{n+1})}{\sum_{j=1}^{n} w(x_j) + w(x_{n+1})}$$

The likelihood ratio $w(x_{n+1})$ is for example estimated. The likelihood ration $w(x_{n+1})$ is for example estimated by using probabilistic classification approaches, i.e. by training a binary domain classifier. A binary domain classifier is for example trained to indicate whether the digital image $x_{n+1}$ is in the same domain as the images in the training data set or not.

In the example of the label "tree" it is expected that the weight $w(x_{n+1})$ is greater than one when the digital image $x_{n+1}$ is captured in the countryside. The weights $$p_i^w(x_{n+1}) \text{ and } p_{n+1}^w(x_{n+1})$$

are then evaluate defined above.

The training data set and the test data may comprise meta data that provides information about the domain the training data set and the test data set is collected in. The model may be configured to determine the likelihood ratio depending on the meta data.

The model may be configured to estimate an occurrence of a digital image in the training data set or in the test data set depending on the information about the domain it was collected in. The model may be configured to determine the probabilities for the occurrence of the digital image in either the training data set or the test data set. The model may be configured to estimate the likelihood ratio.

The model is configured to determine the sub-set $C(x_{n+1})$ of the set of classes for the digital image $x_{n+1}$ depending on the probabilities $\hat{f}(x)$ the model outputs for the digital image $x_{n+1}$ such that the score $s(x_{n+1})$ is smaller than the first threshold.

In the example, the first threshold is the quantile $\hat{q}$ and the model is configured to determine the sub-set $$C(x_{n+1}) = \{y: s(x_{n+1}, y) \leq \hat{q}(x_{n+1})\}$$

This means, that the sub-set $C(x_{n+1})$ for the digital image $x_{n+1}$ comprises the classes y such that the score is equal to or smaller than the quantile $\hat{q}(x_{n+1})$ for the digital image $x_{n+1}$.

The model is configured to determine the size of the sub-set $C(x_{n+1})$ for the digital image $x_{n+1}$.

The model is configured to use the size $|C(x_{n+1})|$ of the sub-set $C(x_{n+1})$ to detect the anomaly.

The model is for example configured to detect the anomaly if the size $|C(x_{n+1})|$ of the sub-set $C(x_{n+1})$ exceeds a second threshold.

The method comprises a step 202.

The step 202 comprises providing the model.

Providing the model comprises training the model with the training data set.

The digital images in the training data set are of an image type, e.g. video, radar, LiDAR, ultrasonic, motion or thermal.

The training data set may comprise digital images depicting at least one object in the first environment or the first environmental condition.

The first environmental condition may be a first lighting condition. The second environmental condition may be a second lighting condition.

The first environmental condition may be nighttime. The second environmental condition may be daytime. Instead of night or day time the lighting condition may be dark, dust or dawn.

The first environmental condition may be a first weather condition. The second environmental condition may be a second weather condition.

The first environmental condition may be rain. The second environmental condition may be sunshine. Instead of rain or sunshine, the weather condition may be fog or snow.

The first environment may be a city environment, i.e. of the domain "city". The second environment may be a countryside environment, i.e. of the domain "countryside". The labels for example comprise a label "tree". When the training data set and the calibration data set is collected predominantly in cities, a number of digital images or pixels with label "tree" is expected to be very little in the training data set and the calibration data set. However, during test time, digital images may be captured in the countryside and encounter lots of trees. Accordingly a larger number of digital images or pixels labels may be encountered as in the training data set or the calibrations data set.

The training data set may be used to train the classification network F to output the probabilities $\hat{f}(x)$ for i=1, . . . , N for the N classes depending on a given digital image x and label y of a pair of the training data set.

The training data set may be used to train the segmentation network F to output the probabilities $\hat{f}(x)$ for i=1, . . . , N for the N classes depending on a given digital image x.

The method comprises a step 204. The step 204 comprises capturing a digital image $x_{n+1}$ for anomaly detection.

The digital image in the example is of the image type. The digital image is in the target domain.

The target domain comprises digital images that are either captured in the first environmental condition or in the second environmental condition.

This means, there is a domain shift from the digital images in the source domain to the digital images in the target domain.

The method comprises a step 206. The step 206 comprises determining the probabilities $$\hat{f}_i(x_{n+1})$$

for the digital image $x_{n+1}$ with the model.

The method comprises a step 208.

The step 208 comprises determining the size $|C(x_{n+1})|$ of the sub set $C(x_{n+1})$ of the set of classes.

In the example, the digital images in the calibration data set and the digital image $x_{n+1}$ are of the same image type as the digital images in the training data set.

The digital images of the training data and of the calibration data are digital images of the source domain. The digital image $x_{n+1}$ is in the target domain.

The source domain for example comprises digital images that are captured in the first environmental condition and in the second environmental condition.

This means, the test data is sampled from the same distribution as the training data. This means the framework of conformal prediction ensures that, for the digital image $x_{n+1}$ in the target domain, the probabilistic coverage guarantee holds.

The size $|C(x_{n+1})|$ of the sub-set $C(x_{n+1})$ is used as the outlier score.

The method comprises a step 210. The step 210 comprises detecting an anomaly depending on the size $|C(x_{n+1})|$.

The anomaly is for example detected upon detecting that the size $|C(x_{n+1})|$ is equal to the second threshold or that the size is larger than the second threshold.

The method may use a predetermined second threshold or prompting a user for the second threshold.

The method comprises a step 212. The step 212 comprises operating the technical system 108 upon detecting the anomaly.

For example the safety function is triggered upon detecting the anomaly.

For example, the emergency stop or the emergency braking is triggered.

The step 212 may comprise that the technical system 108 performs the safety function, in particular the emergency stop or the emergency braking.

The digital images may be stored in the at least one storage 106, e.g. in a buffer. For example, a most recent few hundred digital images collected in particular at regularly spaced time intervals, may be maintained.

For example, the digital images are captured in a transition from the first environmental condition to the second environmental condition, e.g. when driving from a city center towards the outskirts and eventually onto the countryside. A slowly varying estimate of the likelihood ratio between the domains "city", i.e. the city environment, and "countryside", i.e. the countryside environment, may be used in combination with the pretrained binary domain classifier to smoothen the transition. Note that the binary domain classifier may be trained on the training data set. However, the likelihood ratio $w(x_{n+1})$ may be estimated. In fact it is advantageous to directly estimate the likelihood ratio $w(x_{n+1})$ between the domains directly without estimating the likelihoods $p_{test}(x_{n+1})$ or $p_{train}(x_{n+1})$ individually.

What is claimed is:

1. A computer implemented method for processing a digital image for anomaly detection, the method comprising:

providing a model that is trained with a data set that includes digital images to output probabilities that are assigned to classes in a set of classes for classifying or semantically segmenting the digital image depending on the digital image;

determining the probabilities for the digital image with the model; determining a size of a sub-set of the set of classes depending on a sum of the probabilities that are assigned to the classes in the sub-set and depending on a first threshold; and detecting an anomaly depending on the size; wherein the sum of the probabilities that are assigned to the classes in the sub-set is smaller than the first threshold;

wherein the determining of the size of the sub-set includes determining the first threshold depending on a weighted sum of scores; and wherein each score is weighted in the weighted sum depending on a likelihood ratio between a distribution of the probabilities for the digital image and a distribution of probabilities of the digital images in the data set.

2. The method according to according to claim 1, wherein the providing of the model includes training the model depending on the data set, wherein the data set includes digital images depicting at least one object: (i) in a first environment, or (ii) in a first environmental condition including a first lighting condition at night time, or (iii) in a first weather condition including rain, or (iv) in a second environment, or (v) in a second environmental condition in a second lighting condition iat at day time, or (vi) in a second weather condition including sunshine, and wherein the method further comprises:

capturing the digital image for anomaly detection in the first environmental condition or in the second environmental condition.

3. The method according to claim 1, wherein the method further comprises:

capturing, in an environment of a technical system, the digital image including: a video image, or a radar image, or a Light Detection and Ranging (LiDAR) image, or an ultrasonic image, or a motion image, or a thermal image, wherein the technical system is a robot, or a vehicle, or a manufacturing machine, or a power tool, or a medical device, or an access control system, or a personal assist system; and operating the technical system upon detecting the anomaly to trigger a safety function including an emergency stop or an emergency braking.

4. The method according to claim 1, wherein the determining of the size of the sub-set includes selecting the classes for the sub-set from the set of classes such that the sum of the probabilities that are assigned to the classes in the sub-set is smaller than the first threshold.

5. The method according to claim 4, wherein the determining of the size of a sub-set includes determining the score depending on the largest of the probabilities.

6. The method according to claim 5, wherein the method includes determining the score depending on a sum of the largest of the probabilities.

7. The method according to claim 5, wherein the providing of the model includes determining the score for a plurality of pairs, wherein the first threshold is determined depending on a predetermined quantile of the scores that are determined for the plurality of pairs.

8. The method according to claim 1, further comprising detecting the anomaly upon detecting that the size is equal to a second threshold or that the size is larger than a second threshold.

9. The method according to claim 1, wherein the providing of the model including adding a largest of the probabilities to the sum in a descending order of the probabilities.

10. A device for processing a digital image for anomaly detection, comprising:

at least one processor;

at least one storage, wherein the at least one storage is configured to store instructions for processing a digital image for anomaly detection, the instruction, when executed by the at least one processor, causing the at least one processor to perform:

providing a model that is trained with a data set that includes digital images to output probabilities that are assigned to classes in a set of classes for classifying or semantically segmenting the digital image depending on the digital image, determining the probabilities for the digital image with the model, determining a size of a sub-set of the set of classes depending on a sum of the probabilities that are assigned to the classes in the sub-set and depending on a first threshold, and detecting an anomaly depending on the size; wherein the sum of the probabilities that are assigned to the classes in the sub-set is smaller than the first threshold, wherein the determining of the size of the sub-set includes determining the first threshold depending on a weighted sum of scores, and wherein each score is weighted in the weighted sum depending on a likelihood ratio between a distribution of the probabilities for the digital image and a distribution of probabilities of the digital images in the data set.

11. A non-transitory computer-readable medium on which is stored a computer program for processing a digital image for anomaly detection, the computer program, when executed by a computer, causing the computer to perform a method of processing a digital image for anomaly detection, the method comprising:

providing a model that is trained with a data set that includes digital images to output probabilities that are assigned to classes in a set of classes for classifying or semantically segmenting the digital image depending on the digital image;

determining the probabilities for the digital image with the model;

determining a size of a sub-set of the set of classes depending on a sum of the probabilities that are assigned to the classes in the sub-set and depending on a first threshold; and detecting an anomaly depending on the size;

wherein the sum of the probabilities that are assigned to the classes in the sub-set is smaller than the first threshold;

wherein the determining of the size of the sub-set includes determining the first threshold depending on a weighted sum of scores; and wherein each score is weighted in the weighted sum depending on a likelihood ratio between a distribution of the probabilities for the digital image and a distribution of probabilities of the digital images in the data set.

* * * * *